(12) United States Patent
Kanai et al.

(10) Patent No.: US 6,321,544 B1
(45) Date of Patent: Nov. 27, 2001

(54) REFRIGERATING CYCLE

(75) Inventors: Hiroshi Kanai; Shunji Muta; Kenji Iijima; Shunichi Furuya, all of Konan (JP)

(73) Assignee: Zexel Valeo Climate Control Corporation, Saitama (JP)

( * ) Notice: Subject to any disclaimer, the term of this patent is extended or adjusted under 35 U.S.C. 154(b) by 0 days.

(21) Appl. No.: 09/701,176

(22) PCT Filed: Oct. 8, 1998

(86) PCT No.: PCT/JP98/04538

§ 371 Date: Nov. 27, 2000

§ 102(e) Date: Nov. 27, 2000

(87) PCT Pub. No.: WO00/20808

PCT Pub. Date: Apr. 13, 2000

(51) Int. Cl.[7] ............................................. F25B 49/02
(52) U.S. Cl. .................. 62/126; 62/127; 62/129; 62/197; 62/196.3; 62/228.3
(58) Field of Search ............................. 62/125, 126, 127, 62/129, 130, 197, 196.3, 228.1, 228.3, 85, 475

(56) References Cited

U.S. PATENT DOCUMENTS

| | | | |
|---|---|---|---|
| 4,711,096 | * 12/1987 | Krantz | ................................. 62/129 |
| 5,141,407 | * 8/1992 | Ramsey et al. | ................. 62/196.3 X |
| 5,408,840 | * 4/1995 | Talley | ..................................... 62/126 |
| 5,457,965 | * 10/1995 | Blair et al. | ............................. 62/129 |

FOREIGN PATENT DOCUMENTS

| | | |
|---|---|---|
| 3-503206 A | 7/1991 | (JP) . |
| 7/502335 A | 3/1995 | (JP) . |
| 90/07683 | 7/1990 | (WO) . |
| 93/13370 | 7/1993 | (WO) . |

* cited by examiner

*Primary Examiner*—Harry B. Tanner
(74) *Attorney, Agent, or Firm*—Wenderoth, Lind & Ponack, L.L.P.

(57) ABSTRACT

The freezing cycle according to the present invention is provided with a first means for safety that leaks the high pressure to the low-pressure side when the high pressure reaches a level equal to or higher than a first specific pressure, a second means for safety that releases the high pressure into the atmosphere when the high pressure reaches a level equal to or higher than a second specific pressure, a third means for safety that stops the operation of the compressor when the high pressure reaches a level equal to or lower than a third specific pressure and a fourth means for safety that releases the low-pressure into the atmosphere when the low-pressure reaches a level equal to or higher than a specific pressure. In addition, a splash-preventing film is formed over specific areas of devices constituting the freezing cycle.

32 Claims, 4 Drawing Sheets

(a)

(b)

REFRIGERATING CYCLE

TECHNICAL FIELD

The present invention relates to a freezing cycle used in an air-conditioning system for vehicles, and in more specific terms, it relates to a freezing cycle having a safety device that protects components constituting the freezing cycle from damage caused by an abnormally high pressure when carbon dioxide is used as a coolant.

BACKGROUND ART

Examples of freezing cycles in the prior art include the one disclosed in Japanese Unexamined Patent Publication No. H 7-25231. This freezing cycle, which uses a freon coolant, comprises, at least, a compressor which compresses the coolant, and a condenser, an expansion valve and an evaporator which are connected to the compressor in series. The freezing cycle is further provided with an auxiliary coolant passage set parallel to the expansion valve and a valve for opening/closing the auxiliary coolant passage, and the auxiliary coolant passage is opened when the low-level pressure becomes equal to or lower than a specific value.

In this example, by allowing the high pressure to bypass the expansion valve to directly flow into the low-pressure side and by thus preventing low-pressure from becoming reduced, increases in the pressure and the compression temperature at the outlet side of the compressor are prevented.

In addition, there are freezing cycles provided with a device for turning off the cycle by judging that the quantity of the coolant is not sufficient or that the load is too low due to a low external air temperature when the high pressure becomes equal to or lower than a specific value, i.e., freezing cycles provided with a low-level cut switch.

Other safety mechanisms that may be provided in freezing cycles include a device that stops the operation of the compressor when the high pressure becomes equal to or higher than a specific value, a device that stops the compressor when the outlet temperature at the compressor becomes equal to or higher than a specific value, a device that discharges the high-pressure coolant into the atmosphere when the high pressure becomes equal to or higher than a specific value and a fusible plug that allows the coolant to be discharged into the atmosphere when the coolant temperature becomes equal to or higher than a specific value.

However, while extensive research has been conducted into substances other than freon, such as carbon dioxide ($CO_2$), to be used as a coolant in the freezing cycle in air-conditioning systems for vehicles to address the global environment issue, a freezing cycle using carbon dioxide, which has a low critical point of approximately 31.1° C. as the coolant constitutes a reciprocal critical cycle that crosses over the critical point and, as a result, the high pressure in such a freezing cycle is as high as 10 times the high pressure of the freon coolant. Since this pressure level is close to the limit of tolerance of aluminum, it has become more crucial to provide an effective safety device for cycle protection than in a freezing cycle in the prior art that uses a freon coolant (conventional cycle) when designing a heat exchanger or the like by taking into consideration the safety factor.

In more specific terms, since the normal operating pressure on the high pressure side is approximately 10~15 MPa and the coolant does not cross over the critical point to become condensed in the reciprocal critical cycle, the high level side pressure reacts more sharply to fluctuations in the load compared to a freon coolant which becomes condensed on the high pressure side. Thus, it is understood that the likelihood of the high pressure in a reciprocal critical cycle reaching the vicinity of the maximum normal operating pressure is much higher than the likelihood of that occurring in the cycles currently in use. If a high-pressure cut switch is employed in a reciprocal critical cycle, a problem will occur in that the high-pressure cut switch will be activated too frequently. It is to be noted that the high pressure in the conventional cycle is approximately 1.2~3 MPa, with the setting for the high pressure cut switch at approximately 3 MPa.

In addition, since the critical point of the coolant is low in the reciprocal critical cycle, the balance pressure between the high-pressure side and the low-pressure side in the reciprocal critical cycle left in hot daylight becomes as high as approximately 10 MPa. While it is desirable to minimize the coolant volume on the high-pressure side in order to prevent the balance pressure from rising, there is a problem in that minimizing the coolant volume on the high-pressure side would increase the passage resistance on the high-pressure side to result in a large pressure loss.

Thus, when using carbon dioxide as an alternative coolant to freon, it is necessary to take safety measures to prevent damage to various components which would be caused by the high pressure while taking into consideration the eventuality of such damage occurring.

Accordingly, an object of the present invention is to provide a freezing cycle having a means for safety that is most suited for application in a freezing cycle using carbon dioxide as a coolant.

DISCLOSURE OF THE INVENTION

The freezing cycle according to the present invention, which uses carbon dioxide for a coolant and comprises, at least, a compressor that compresses the coolant to a level in a super critical range, a radiator that cools the compressed coolant, an expansion device that lowers the pressure of the cooled coolant down to a gas/liquid mixed range and an evaporator that evaporates a liquid-phase coolant generated by the expansion device, having a high-pressure line extending from the outlet side of the compressor to the intake side of the expansion device and a low-pressure line extending from the outlet side of the expansion valve to the intake side of the compressor, is further provided with a first means for safety that communicates between the high-pressure line and the low-pressure line when the pressure in the high-pressure line becomes equal to or higher than a first specific pressure, a second means for safety that communicates between the high-pressure line and the atmosphere when the pressure in the high-pressure line becomes equal to or higher than a second specific pressure higher than the first specific pressure, a third means for safety that stops the drive of the compressor when the pressure in the high-pressure line becomes equal to or lower than a third specific pressure and a fourth means for safety that communicates between the low-pressure line and the atmosphere when the pressure in the low-pressure line becomes equal to or higher than a fourth specific pressure higher than the third specific pressure.

In addition, it is desirable to constitute the first means for safety with a high-pressure relief valve that releases the high pressure toward the low-pressure side when the high pressure reaches the first specific pressure. Furthermore, in consideration of the pressure loss in the high-pressure line occurring as a result of minimizing the high-pressure side coolant volume to lower the balance pressure when the vehicle is left in the hot sun, the high-pressure relief valve should communicate between the area near the outlet side of the compressor and the area in the vicinity of the intake side of the compressor.

In consideration of the tendency of carbon dioxide to leak easily, it is more desirable to assume a structure that ruptures at a preset pressure level rather than a valve structure in the second means for safety, and more specifically, it is desirable to constitute the second means for safety with a high-pressure rupture disk that ruptures at the second specific pressure higher than the first specific pressure.

The third means for safety, which is provided to protect the compressor from any damage that may otherwise occur when the coolant leaks, stops the compressor when the pressure in the high-pressure line becomes equal to or lower than the third specific pressure. More specifically, it is provided with a pressure sensor that detects the high pressure, and stops the means for driving the compressor when the level of the pressure detected by the pressure sensor is equal to or lower than the third specific pressure (by shutting down the electromagnetic clutch linking the compressor to the engine, stopping the motor, etc.).

It is desirable to constitute the fourth means for safety with a low-pressure rupture disk which ruptures when the pressure in the low-pressure line is at the fourth specific pressure level higher than the third specific pressure. Since the pressure in the low-pressure line rises as the temperature increases in the event of a fire occurring in the engine room, the low-pressure rupture disk will fulfill a function similar to that of a fusible plug in the prior art. In addition, since it achieves a pressure-dependent function, it prevents damage occurring when the coolant is charged to an excessive degree by mistake. Furthermore, it is capable of tolerating an abnormal increase in the balance pressure occurring when the vehicle is left in the hot sun.

Alternatively, a safety device comprising a relief valve constituting the first means for safety, a high-pressure rupture disk constituting the second means for safety and a low-pressure rupture disk constituting the fourth means for safety provided as an integrated unit, may be created to be installed as an integrated part of the compressor.

In addition, in order to further improve the safety of the freezing cycle, a splash-preventing film should be formed over the areas where rupture may occur due to a high pressure, such as the header tank of the radiator, the accumulator main unit, the hose caulking metal fixtures and the evaporator tank. It is desirable to constitute the splash-preventing film by using PET (polyethylene terephthalate) are PVB (polyvinyl butyryl) to form a base member with an adhesive layer formed on the surface of the base member. Alternatively, a laminated sheet constituted by enclosing a fibrous substance or a fibrous sheet constituted of resin or metal in the base member may be used instead.

THE BEST MODE FOR CARRYING OUT THE INVENTION

Figure 1:
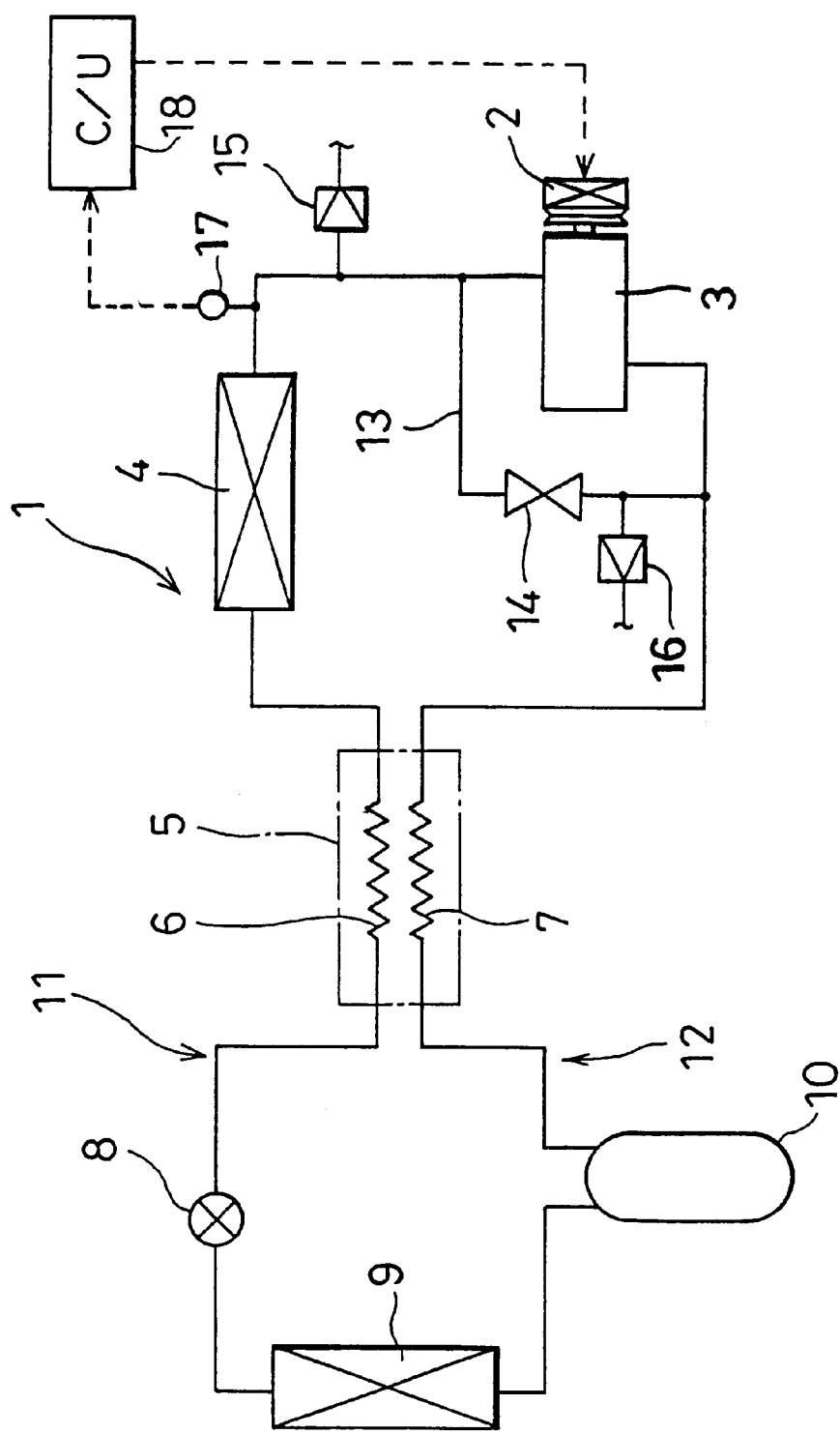
FIG. 1 is a schematic block diagram of the reciprocal critical cycle according to the present invention.

A Freezing cycle 1 in FIG. 1, which uses carbon dioxide as a coolant, is provided with a compressor 3 driven by the engine (not shown) via an electromagnetic clutch 2 linking them. A radiator (gas cooler) 4 that cools the coolant that has been compressed by the compressor 3 to a level in a super critical range is connected to the outlet side of the compressor 3. Since the coolant is in the super critical range, the coolant remains a gas-phase coolant even when it has been cooled in the gas cooler 4 and, thus, the gas-phase coolant flows into a first heat exchanging unit 6 constituting an internal heat exchanger 5 at the next stage. The gas-phase coolant flowing through the first heat exchanging unit 6 in the internal heat exchanger 5 becomes further cooled through a heat exchange with the low-pressure, low-temperature gas-phase coolant passing through a second heat exchanging unit 7 of the internal heat exchanger 5, which is to be detailed below, to be delivered to an expansion device 8. The expansion device 8 lowers the pressure of the high-pressure gas-phase coolant down to a gas/liquid mixed range, and is constituted as a type of automatic expansion valve. The coolant in the gas/liquid mixed state resulting from the pressure reduction at the expansion device 8 absorbs heat at an evaporator 9 provided on the downstream side relative to the expansion device 8 and evaporates to become a gas-phase coolant.

An accumulator 10 is provided on the downstream side relative to the evaporator 9. At the accumulator 10, the quantity of the coolant flowing through the entire freezing cycle is adjusted and gas/liquid separation is achieved. The coolant having undergone the gas/liquid separation is then delivered to the second heat exchanging unit 7 of the internal heat exchanger 5 mentioned earlier. The coolant delivered from the accumulator 10 to the second heat exchanging unit 7 then undergoes heat exchange with the gas-phase coolant passing through the first heat exchanging unit 6 to become heated and is taken into the compressor 3. Thus, the freezing cycle 1, which absorbs heat at the evaporator 9 and radiates heat at the gas cooler 4, is achieved.

It is to be noted that in this freezing cycle 1, the range extending from the outlet side of the compressor 3 to the intake side of the expansion device 8 is defined as a high-pressure line 11 and the range extending from the outlet side of the expansion device 8 to the intake side of the compressor 3 is defined as a low-pressure line 12.

While the normal operating pressure in the high-pressure line 11 is approximately 10~15 MPa in the freezing cycle 1 structured as described above, the pressure tolerance of the gas cooler 4 constituted of an aluminum material, in particular, is 20 MPa at the most under normal circumstances due to such factors as the heat exchanging rate, the weight and the cost that must be taken into consideration, and thus, it is necessary to take safety measures to protect the freezing cycle. Accordingly, according to the present invention, a bypass passage 13 communicating between the high-pressure line 11 in the vicinity of the outlet side of the compressor 3 and the low-pressure line 12 in the vicinity of the intake side of the compressor 3 and a relief valve 14 located at the bypass pixels 13 which releases the high-pressure coolant into the low-pressure line 12 when the high pressure in the high-pressure line 11 reaches a level equal to or higher than a first specific value (e.g., 16~18 MPa) are provided to constitute a first means for safety. With the high-pressure coolant released into the low-pressure line 12 when the pressure in the high-pressure line 11 reaches a level equal to or higher than the first specific value in this manner, the high pressure can be lowered. It is to be noted that the high-pressure side of the bypass passage 13 is set in the vicinity of the outlet side of the compressor 3 in this structure by taking into consideration the pressure loss in the high-pressure line 11. In other words, it is necessary to minimize the high-pressure side coolant volume in the high-pressure line 11 in order to prevent the balance pressure from rising when the vehicle is left in the hot sun. Thus, a certain degree of pressure difference is bound to occur due to the pressure loss between the vicinity of the outlet side of the compressor 3 and the vicinity of the intake side of the expansion device 8. Accordingly, in order to eliminate problems occurring as a result of an increase in the high pressure, the high-pressure side of the bypass passage 13 should be set as close as possible to the outlet side of the compressor 3.

In addition, at a specific position in the high-pressure line 11, a rupture disk 15 which ruptures at a second specific pressure (e.g., 18~20 MPa) higher than the first specific pressure is provided as a second means for safety. As a result, when the high pressure reaches the level of the first specific pressure, the rupture disk 15 ruptures to open communication between the high-pressure line 11 and the atmosphere, thereby discharging the coolant in the high-pressure line 11 into the atmosphere and thus protecting the various devices in the freezing cycle 1 from an abnormally high pressure.

A high pressure detection sensor 17 constituting a third means for safety is provided in the high-pressure line 11, and the high pressure detected by the high pressure detection sensor 17 is input to a control unit 18 where it is compared against a third specific pressure (which may be set at, for instance, 2~4 MPa). If it is decided that the detected high pressure is equal to or lower than the third specific pressure, the power supply to the electromagnetic clutch 2 is stopped to disconnect the compressor 3 from the engine (not shown) thereby stopping the drive of the compressor 3. Thus, since a reduction in the quantity of coolant resulting from a coolant leak or the like can be identified as the cause of the high pressure becoming lowered to a level equal to or lower than the third specific pressure, the compressor 3 is stopped to protect the compressor in such an event.

Furthermore, a rupture disk 16 which ruptures at a fourth specific pressure (approximately 12~13 MPa) higher than the balance pressure (approximately 10 MPa) is provided in the low-pressure line 12 as a fourth means for safety, so that the various devices provided on the low-pressure line 12 are protected by communicating between the low-pressure line 12 and the atmosphere and releasing the coolant whose pressure has risen into the atmosphere.

By providing the four means for safety described above in the freezing cycle 1, the safety in the freezing cycle 1 using carbon dioxide as the coolant is improved.

Figure 2:
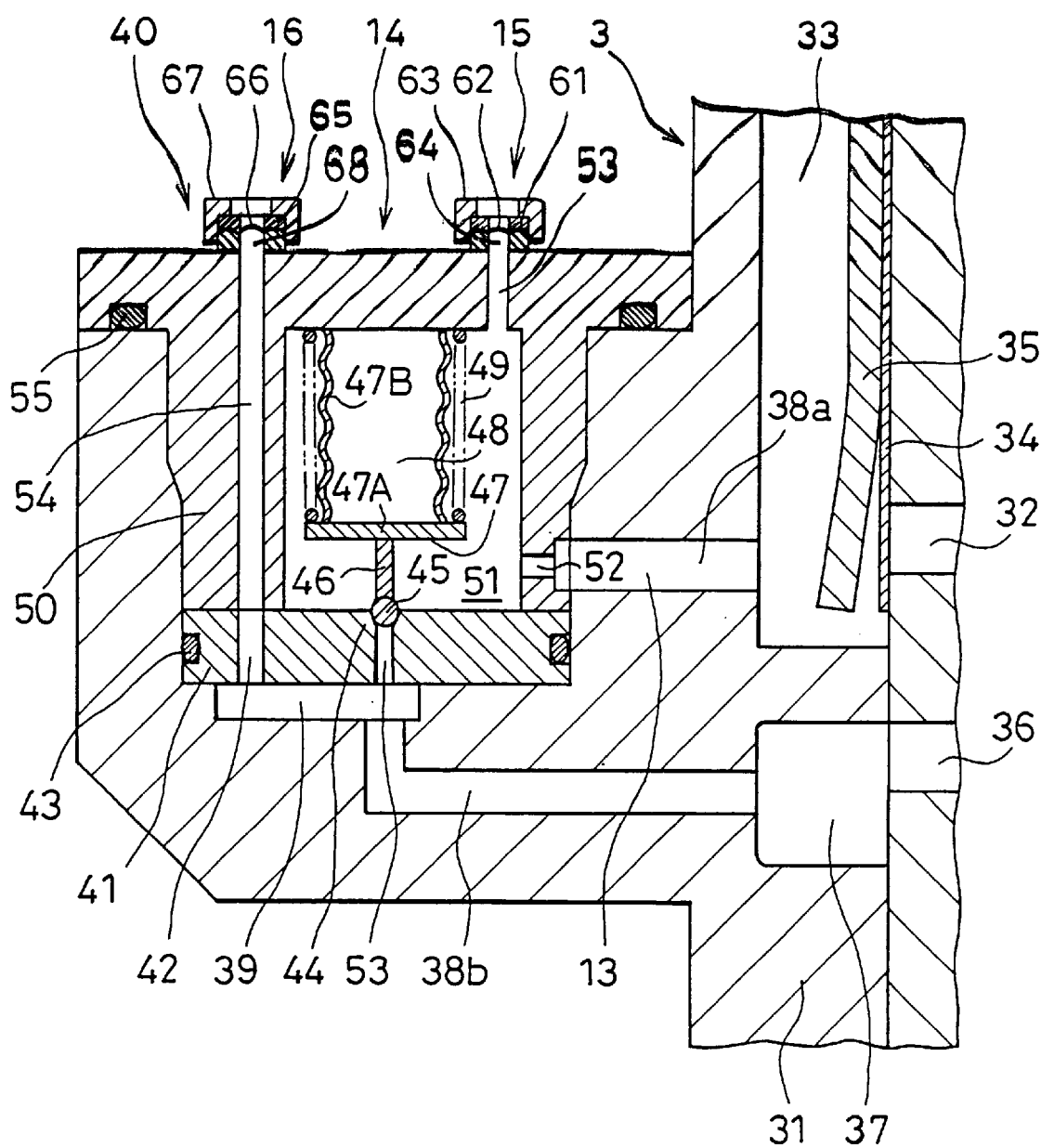
FIG. 2 is an enlarged sectional view of a portion of an embodiment having a safety device mounted at the compressor.

In the embodiment illustrated in FIG. 2, a safety device 40 achieved by forming the first, second and fourth means for safety as an integrated unit is installed as an integrated part of the compressor 3. In this embodiment, the safety device 40 is mounted at a rear housing 31 of the compressor 3, with the rear housing 31 having an outlet space 33, which communicates with an outlet hole 32 communicating with a compression space (not shown) of the compressor when an outlet valve 34 is opened, formed therein. In the rear housing 31, an intake space 37 communicating with an intake hole 36 which communicates with the compression space is also formed. The outlet space 33 communicates with the gas cooler 4 via an outlet hole (not shown) and the intake space 37 communicates with the second heat exchanging unit 7 of the internal heat exchanger 5 via an intake hole (not shown). In addition, a high-pressure side bypass passage 38a and a low-pressure side bypass passage 38b constituting the bypass passage 13 are provided at the rear housing 31, with the safety device 40 mounted between the high-pressure side bypass passage 38a and the low-pressure side bypass passage 38b.

The safety device 40 is mounted so as to block off a low-pressure side space 39 formed at one end of the low-pressure side bypass passage 38b, and is provided with a valve seat plate 41 having two through holes 42 and 53 communicating with the low-pressure side space 39. In addition, a valve seat 44 is formed at one end of the through hole 53 at the valve seat plate 41. It is to be noted that reference number 43 indicates an O-ring which seals the circumferential edge of the valve seat plate 41.

At a valve housing 50 having a high-pressure space 51 one side of which is blocked off by the valve seat plate 41, a communicating hole 52 communicating between the high-pressure space 51 and the high-pressure side bypass passage 38a and a high-pressure side release hole 53 communicating between the high-pressure space 51 and the atmosphere are formed. At the valve housing, which defines the high-pressure space 51, a low-pressure side release hole 54 communicating with the through hole 42 at the valve seat plate 41 is formed.

In the high-pressure space 51, a valve element 45, which closes the through hole 53 when it is seated on the valve seat 44, is provided and the valve element 45 is connected with a bellows 47 via a rod 46. The bellows 47 is constituted of a plate portion 47A which is linked to the rod 46 and holds a spring 49 that applies a force to the valve element 45 toward the valve seat via the rod 46 and a retractable bellows portion 47B that defines an internal space 48 into which a gas achieving a specific pressure level is sealed. When the high pressure within the high-pressure space 51 reaches a level equal to or higher than the first specific pressure, i.e., when the high pressure becomes larger than the resultant force that includes the force applied by the spring 49 and the pressure of the gas sealed in the bellows 47, the bellows portion 47B becomes contracted, causing the valve element 45 to depart from the valve seat 44, thereby allowing the high-pressure side bypass passage 38a and the low-pressure side bypass passage 38b to communicate with each other. Thus, the relief valve 14 functions as the first means for safety.

In addition, at the front end of the high-pressure side release hole 53, the high-pressure side rupture disk 15, which ruptures at the second specific pressure, is provided as the second means for safety. In the high-pressure side rupture disk 15, which is constituted of a disk portion 62 that ruptures at the second specific pressure, a retaining portion 61 that holds the disk portion and a screw portion 63 that secures the retaining portion 61, the disk portion 62 ruptures to set the high-pressure side release hole 53 and the atmosphere in a communicating state when the high pressure in the high-pressure space 51 reaches a level equal to or higher than the second specific pressure.

At the front end of the low-pressure side release hole 54, the low-pressure side rupture disk 16, which ruptures at the fourth specific pressure is provided as the fourth means for safety. In the low-pressure side rupture disk 16, which is constituted of a disk portion 66 that ruptures at the fourth specific pressure, a retaining portion 65 that holds the disk portion 66 and a screw portion 67 that secures the retaining portion 65, the disk portion 66 ruptures to set the low-pressure side release hole 54 and the atmosphere in the communicating state when the low-pressure in the low-pressure side space 39 reaches a level equal to or higher than the fourth specific pressure. It is to be noted that reference number 55 indicates an O-ring that seals the space between the valve housing and the rear housing 31.

Figure 3:
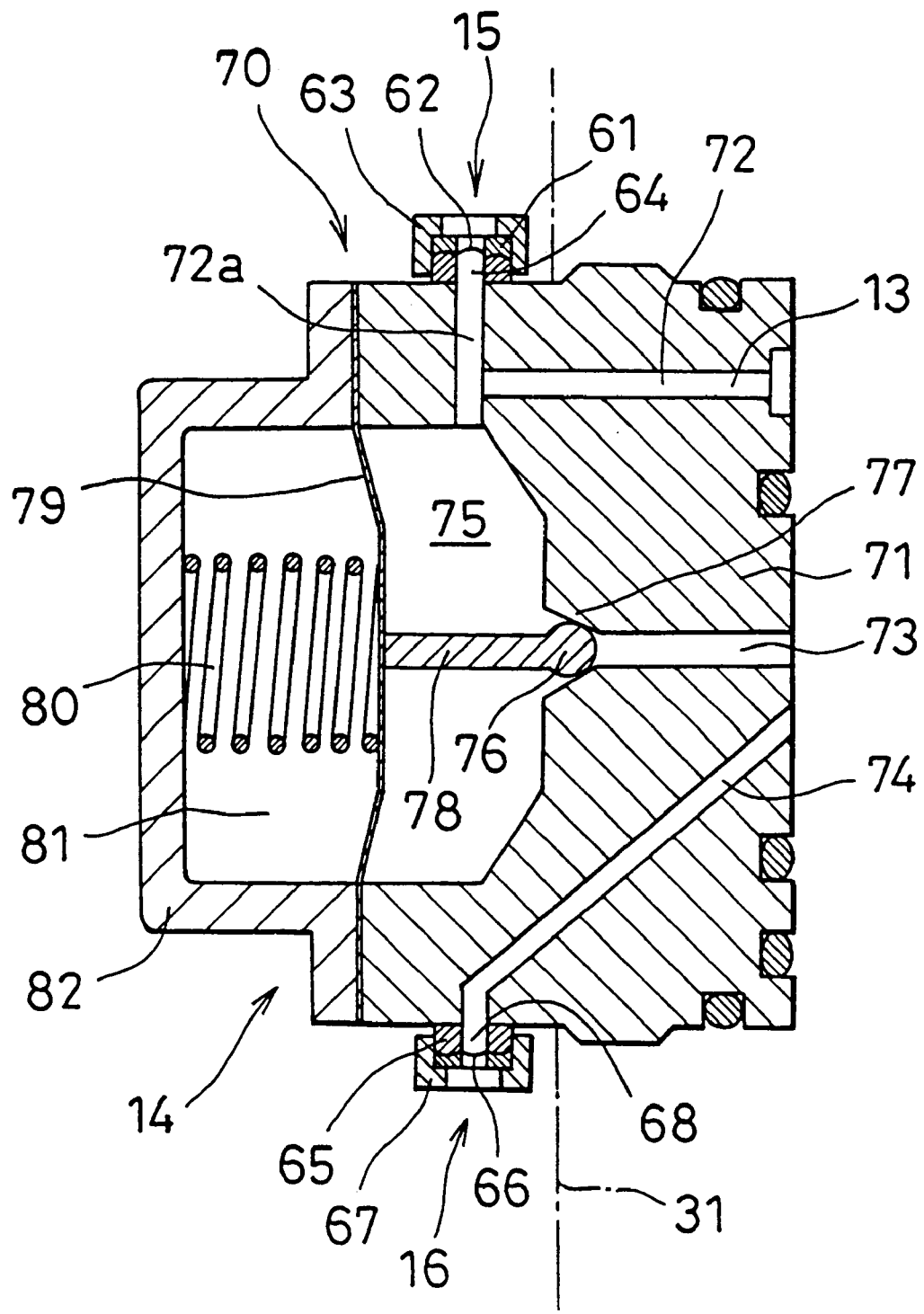
FIG. 3 is an enlarged sectional view of a portion of another embodiment of the safety device.

FIG. 3 presents a variation of the embodiment shown in FIG. 2. In this safety device 70, which is mounted at the rear housing 31 of the compressor as is the safety device in the previous embodiment, a valve block 71 is provided to be mounted at the rear housing 31. In the valve block 71, a high-pressure side passage 72 that is to communicate with the high-pressure side bypass passage described earlier and a low-pressure side passage 73 to communicate with the low-pressure side bypass passage are formed, with a valve seat 77 formed at an end on the inside of the low-pressure side passage 73. Furthermore, a high-pressure side release passage 72a and a low-pressure side release passage 74 are formed at the valve block 71.

One end of the valve block 71 is blocked off by a diaphragm 79, thereby defining a high-pressure space 75. In the high-pressure space 75, a valve element 76 which blocks off the low-pressure side passage 73 when it is seated on the valve seat 77, is provided, with the valve element 76 linked with the diaphragm 79 via a rod 78. The circumferential edge of the diaphragm 79 is clamped and secured by a case 82 defining a rear chamber space 81 located rearward relative to the diaphragm 79 and also by the valve block 71. A spring 80 which applies a force to the valve element 76 toward the valve seat 77 via the diaphragm 79 and the rod 78 is provided in the rear chamber space 81. In addition, a gas at a specific pressure level is sealed into the rear chamber space 81 as in the previous embodiment. Thus, a relief valve fulfilling a function as the first means for safety is achieved.

At the front end of the high-pressure side release passage 72a, the high-pressure side rupture disk 15 is provided as in the previous embodiment, whereas the low-pressure side rupture disk 16 is provided at the front end of the low-pressure side release passage 74 as in the previous embodiment. By adopting the structure described above, advantages similar to those achieved in the previous embodiment are realized.

Furthermore, in the freezing cycle 1 assuming the structure described above, a splash-preventing film is formed through coating, spraying or deposition over areas such as the tank portions of the gas cooler 4, the main unit of the accumulator 10, the tank portions at the evaporator 9, the oil separator main unit which is not shown in FIG. 1 but may be provided as necessary and the linking areas, as another means for safety.

Figure 4:
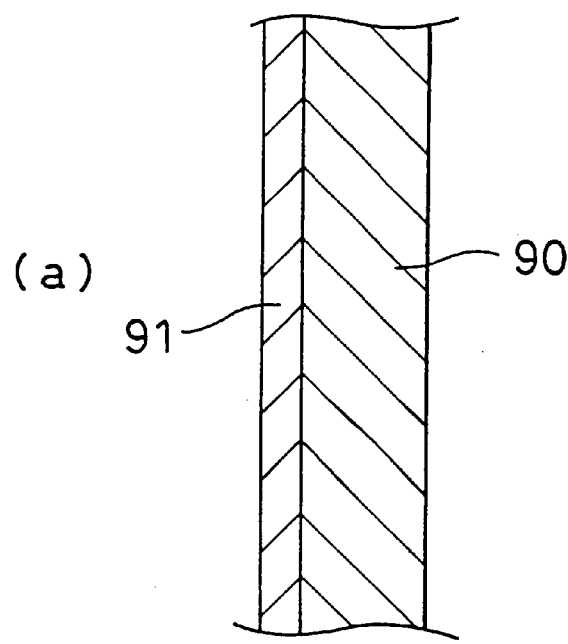
FIGS. 4(a) and 4(b) each present an enlarged sectional view of a portion of a splash-preventing film.
Figure 4:
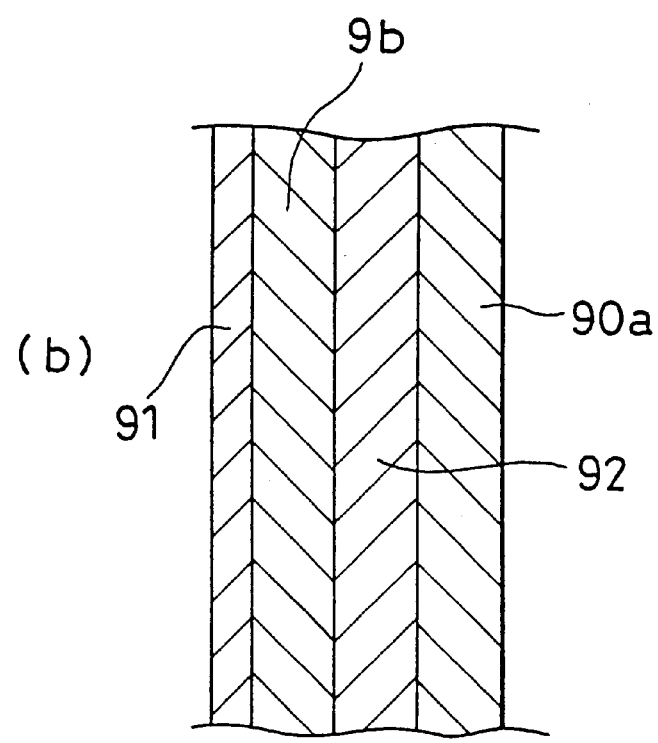

The splash-preventing film shown in FIG. 4(a) is constituted by using as a base member 90 preferably PET (polyethylene terephthalate) or PVB (polyvinyl butyryl), i.e., a resin such as a polyethylene resin, a polypropylene resin, a polyvinyl chloride risen or a polyester resin and then forming an adhesive layer 91 on the surface of the base member 90. The splash-preventing film shown in FIG. 4(b) is constituted as a laminated sheet by enclosing a fibrous substance constituted of resin or mental as a reinforcement layer 92 in the base member 90 (between the base members 90a and 90b) constituting the splash-preventing film described above.

By providing this means for safety, any splashing resulting from ruptured parts can be prevented even when a rapid fluctuation in the pressure occurs in an unexpected event such as an accident.

Industrial Applicability

As described above, the freezing cycle according to the present invention, provided with the first means for safety that leaks high pressure into the low-pressure side when the high pressure reaches a level equal to or higher than the first specific pressure, the second means for safety that releases the high pressure into the atmosphere when the high pressure reaches a level equal to or higher than the second specific pressure, the third means for safety that stops the operation of the compressor when the high pressure reaches a level equal to or lower than the third specific pressure and the fourth means for safety that releases the low-level pressure into the atmosphere when the low-pressure reaches a level equal to or higher than a specific pressure, improves the safety of the freezing cycle using carbon dioxide as the coolant. As a result, the freezing cycle using carbon dioxide as the coolant as an alternative to a freon coolant can be employed in an air-conditioning system for vehicles with peace of mind.

Moreover, by forming a splash-preventing film over areas where a rupture is likely to occur when the pressure in the freezing cycle fluctuates to an abnormal level, the safety level can be further improved.

What is claimed is:

1. A freezing cycle that uses carbon dioxide as a coolant, comprising, at least: a compressor that compresses the coolant to a super critical range; a radiator that cools the compressed coolant; an expansion device that lowers the pressure of the cooled coolant down to a gas/liquid mixed range; and an evaporator that evaporates a liquid-phase coolant generated by said expansion device, and also having a high-pressure line extending from an outlet side of said compressor to an intake side of said expansion device and a low-pressure line extending from an outlet side of said expansion valve to an intake side of said compressor, characterized by providing with;

a first means for safety that communicates between said high-pressure line and said low-pressure line when the pressure in said high-pressure line becomes equal to or higher than a first specific pressure;

a second means for safety that communicates between said high-pressure line and the atmosphere when the pressure in said high-pressure line becomes equal to or higher than a second specific pressure higher than the first specific pressure;

a third means for safety that stops the drive of said compressor when the pressure in said high-pressure line becomes equal to or lower than a third specific pressure; and a fourth means for safety that communicates between said low-pressure line and the atmosphere when the pressure in said low-pressure line becomes equal to or higher than a fourth specific pressure, higher than the third specific pressure.

2. A freezing cycle according to claim 1, characterized in that;

said first means for safety is constituted of a high-pressure relief valve that releases the high pressure to the low-pressure side when the high pressure becomes equal to the first specific pressure.

3. A freezing cycle according to claim 2, characterized in that;

said high-pressure relief valve communicates between the vicinity of the outlet side of said compressor and the vicinity of the intake side of said compressor.

4. A freezing cycle according to claim 3, characterized in that;
said second means for safety is constituted of a high-pressure side rupture disk that ruptures at the second specific pressure higher than the first specific pressure.

5. A freezing cycle according to claim 3, characterized in that;
said third means for safety stops said compressor when the pressure in said high-pressure line reaches a level equal to or lower than the third specific pressure.

6. A freezing cycle according to claim 3, characterized in that;
said fourth means for safety is constituted of a low-pressure side rupture disk that ruptures when the pressure in said low-pressure line becomes equal to the fourth specific pressure higher than the third specific pressure.

7. A freezing cycle according to claim 3, characterized in that;
a safety device having an integrated unit that includes a relief valve constituting said first means for safety, a high-pressure side rupture disk constituting said second means for safety and a low-pressure side rupture disk constituting said fourth means for safety is created and said safety device is installed as an integrated part of said compressor.

8. A freezing cycle according to claim 3, characterized in that;
a splash-preventing film is formed at said radiator, said accumulators and said evaporator.

9. A freezing cycle according to claim 2, characterized in that;
a safety device having an integrated unit that includes a relief valve constituting said first means for safety, a high-pressure side rupture disk constituting said second means for safety and a low-pressure side rupture disk constituting said fourth means for safety is created and said safety device is installed as an integrated part of said compressor.

10. A freezing cycle according to claim 9, characterized in that;
a splash-preventing film is formed at said radiator, said accumulators and said evaporator.

11. A freezing cycle according to claim 2, characterized in that;
said second means for safety is constituted of a high-pressure side rupture disk that ruptures at the second specific pressure higher than the first specific pressure.

12. A freezing cycle according to claim 2, characterized in that;
said third means for safety stops said compressor when the pressure in said high-pressure line reaches a level equal to or lower than the third specific pressure.

13. A freezing cycle according to claim 2, characterized in that;
said fourth means for safety is constituted of a low-pressure side rupture disk that ruptures when the pressure in said low-pressure line becomes equal to the fourth specific pressure higher than the third specific pressure.

14. A freezing cycle according to claim 2, characterized in that;
a splash-preventing film is formed at said radiator, said accumulators and said evaporator.

15. A freezing cycle according to claim 1, characterized in that;
said second means for safety is constituted of a high-pressure side rupture disk that ruptures at the second specific pressure higher than the first specific pressure.

16. A freezing cycle according to claim 15, characterized in that;
said third means for safety stops said compressor when the pressure in said high-pressure line reaches a level equal to or lower than the third specific pressure.

17. A freezing cycle according to claim 15, characterized in that;
said fourth means for safety is constituted of a low-pressure side rupture disk that ruptures when the pressure in said low-pressure line becomes equal to the fourth specific pressure higher than the third specific pressure.

18. A freezing cycle according to claim 15, characterized in that,
a safety device having an integrated unit that includes a relief valve constituting said first means for safety, a high-pressure side rupture disk constituting said second means for safety and a low-pressure side rupture disk constituting said fourth means for safety is created and said safety device is installed as an integrated part of said compressor.

19. A freezing cycle according to claim 15, characterized in that;
a splash-preventing film is formed at said radiator, said accumulators and said evaporator.

20. A freezing cycle according to any of claim 1, characterized in that;
said third means for safety stops said compressor when the pressure in said high-pressure line reaches a level equal to or lower than the third specific pressure.

21. A freezing cycle according to claim 20, characterized in that;
said fourth means for safety is constituted of a low-pressure side rupture disk that ruptures when the pressure in said low-pressure line becomes equal to the fourth specific pressure higher than the third specific pressure.

22. A freezing cycle according to claim 20, characterized in that;
a safety device having an integrated unit that includes a relief valve constituting said first means for safety, a high-pressure side rupture disk constituting said second means for safety and a low-pressure side rupture disk constituting said fourth means for safety is created and said safety device is installed as an integrated part of said compressor.

23. A freezing cycle according to claim 20, characterized in that;
a splash-preventing film is formed at said radiator, said accumulators and said evaporator.

24. A freezing cycle according to claim 1, characterized in that;
said fourth means for safety is constituted of a low-pressure side rupture disk that ruptures when the pressure in said low-pressure line becomes equal to the fourth specific pressure higher than the third specific pressure.

25. A freezing cycle according to claim 24, characterized in that;
a safety device having an integrated unit that includes a relief valve constituting said first means for safety, a high-pressure side rupture disk constituting said second means for safety and a low-pressure side rupture disk constituting said fourth means for safety is created and said safety device is installed as an integrated part of said compressor.

26. A freezing cycle according to claim 24, characterized in that;

a splash-preventing film is formed at said radiator, said accumulators and said evaporator.

27. A freezing cycle according to claim 1, characterized in that;

a splash-preventing film is formed at said radiator, said accumulators and said evaporator.

28. A freezing cycle according to claim 27, characterized in that;

said splash-preventing film is constituted by using PET (polyethylene terephthalate) as a base member and forming an adhesive layer at a surface of said base member.

29. A freezing cycle according to claim 28, characterized in that;

said splash-preventing film is constituted as a laminated sheet by enclosing a fibrous substance in said base member.

30. A freezing cycle according to claim 27, characterized in that;

said splash-preventing film is constituted by using PVB (polyvinyl butyryl) as a base member and forming an adhesive layer at a surface of said base member.

31. A freezing cycle according to claim 30, characterized in that;

said splash-preventing film is constituted as a laminated sheet by enclosing a fibrous substance in said base member.

32. A freezing cycle according to claim 27, characterized in that;

said splash-preventing film is constituted as a laminated sheet by enclosing a fibrous substance in said base member.

* * * * *